United States Patent [19]
Huang

[11] Patent Number: 6,047,522
[45] Date of Patent: Apr. 11, 2000

[54] PRESS SEALING STRUCTURE OF A SEALING MACHINE

[76] Inventor: Mao-Sen Huang, No. 131, Hai Lai 1st Street, Ta li City, Taichung Hsien, Taiwan

[21] Appl. No.: 09/208,929

[22] Filed: Dec. 10, 1998

[51] Int. Cl.[7] ..................................................... B65B 51/10
[52] U.S. Cl. ...................... 53/373.7; 53/374.8; 53/374.9; 53/375.6
[58] Field of Search ............................... 53/373.7, 374.8, 53/374.9, 375.6, 375.9, 512

[56] References Cited

U.S. PATENT DOCUMENTS

| | | | |
|---|---|---|---|
| 4,860,523 | 8/1989 | Teteishi et al. | 53/512 |
| 4,941,310 | 7/1990 | Kristne | 53/512 |
| 5,177,931 | 1/1993 | Latter | 53/374.8 |
| 5,177,937 | 1/1993 | Alden | 53/374.8 |
| 5,239,808 | 8/1993 | Wells et al. | 53/374.8 |
| 5,638,664 | 6/1997 | Levsen et al. | 53/374.8 |

*Primary Examiner*—Eugene L. Kim
*Attorney, Agent, or Firm*—Connolly, Dove, Lodge & Hutz

[57] ABSTRACT

A press sealing structure of a sealing machine includes a control box on a machine base. The control box has both sides respectively connected pivotally to respective links by respective axial bolts. The links have respective front ends extending out from the machine base to connect securely with a placement press plate. A heating plate extends upwardly from the placement press plate. A screw bolt is secured screwably on that part of each of the links inside the machine base. The screw bolt urges against a contact press plate of a microswitch. A middle section of each of the links is connected pivotally with a substantially L-shaped seat plate by means of an axial bolt. The seat plate has a front end extending out from the machine base to connect securely with an upper press rod; a heat-resistant plastic strip being provided clampingly at a lower portion of the upper press rod. A spring is disposed intermediate said seat plate and the respective one of said links. By means of this arrangement, operation of sealing openings of plastic bags by the sealing machine can be precisely controlled and proceeded.

4 Claims, 3 Drawing Sheets

PRESS SEALING STRUCTURE OF A SEALING MACHINE

BACKGROUND OF THE INVENTION (a) Field of the Invention

The present invention relates generally to a sealing machine adapted to seal the opening of a plastic bag, and more particularly to a press sealing structure of the sealing machine to achieve quick and precise control of the sealing operation.

(b) Description of the Prior Art

In packaging things in a plastic bag, the opening of the plastic bag has to be closed using a sealing machine. However, in using a conventional sealing machine, the operator has to place the opening of the plastic bag properly in a fusing position on the sealing machine with both hands and then use his/her fingers or foot to press a switch to start a linking-up mechanism to accomplish the sealing of the plastic bag. If the operator does not hold the side ends of the opening of the plastic bag when the opening is being hot pressed in the sealing operation, the air inside the plastic bag will, due to squeezing, cause the press lines at the opening of the plastic bag to be irregular and slanting. This is due to the fact that the operator has to simultaneously press the start switch with his/her fingers or foot. Improvement on the prior art is therefore necessary.

SUMMARY OF THE INVENTION

A primary object of the present invention is to provide a press sealing structure of a sealing machine to eliminate the problems with the prior art. According to the present invention, a control box is disposed on a machine base. The control box has both sides respectively connected pivotally to respective links by respective axial bolts, the links having respective front ends extending out from the machine base to connect securely with a placement press plate. A heating plate extends upwardly from the placement press plate. A screw bolt is secured screwably on that part of each of the links inside the machine base. The screw bolt urges against a contact press plate of a microswitch. A section of each link is connected pivotally with a substantially L-shaped seat plate by means of an axial bolt. The seat plate has a front end extending out from the machine base to connect securely with an upper press rod. A heat-resistant plastic strip is provided clampingly at a lower portion of the upper press rod, and a spring is disposed intermediate the seat plate and the respective one of the links.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
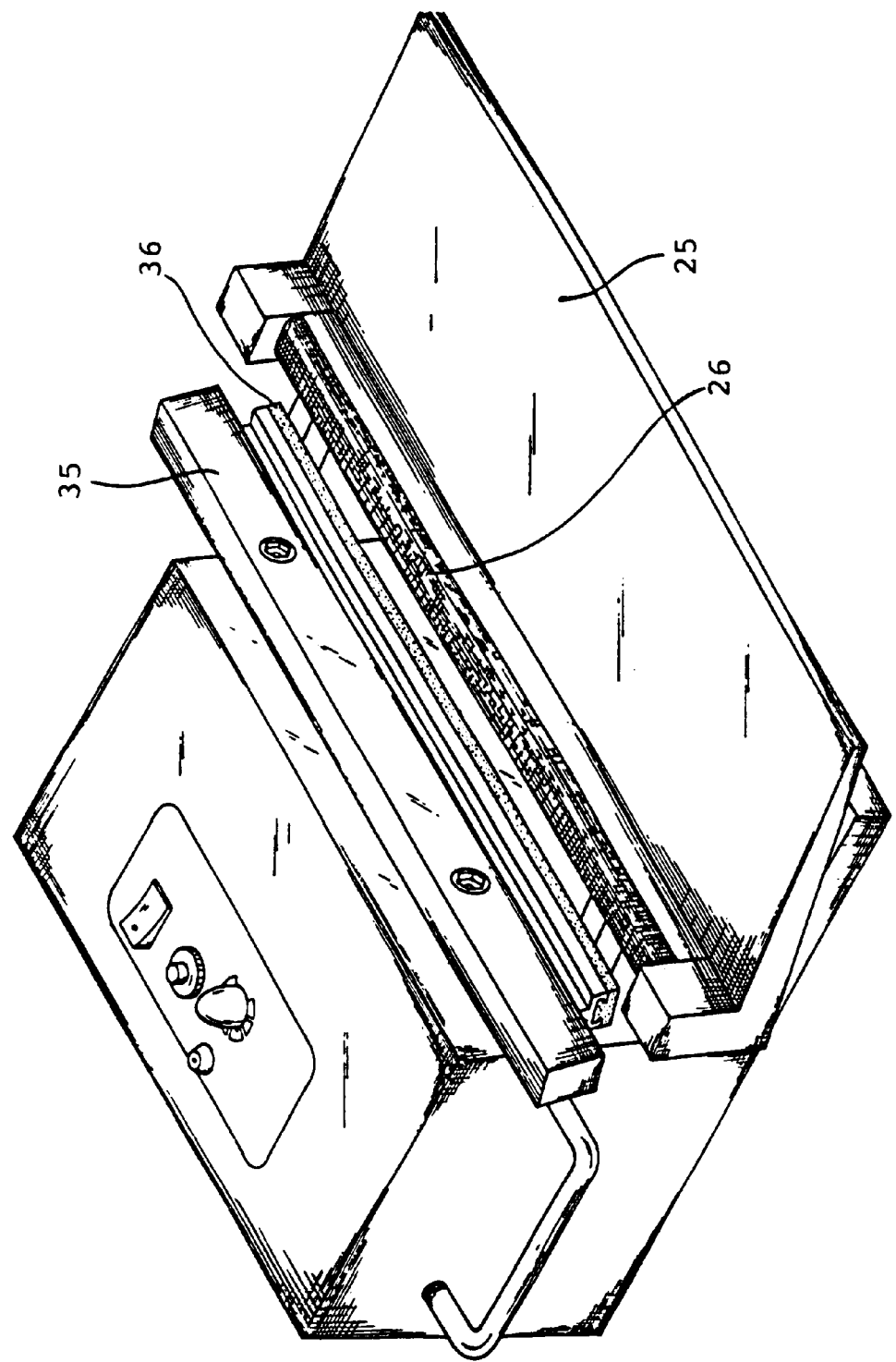
FIG. 1 is a perspective view of a press sealing structure of a sealing machine according to the present invention.
Figure 2:
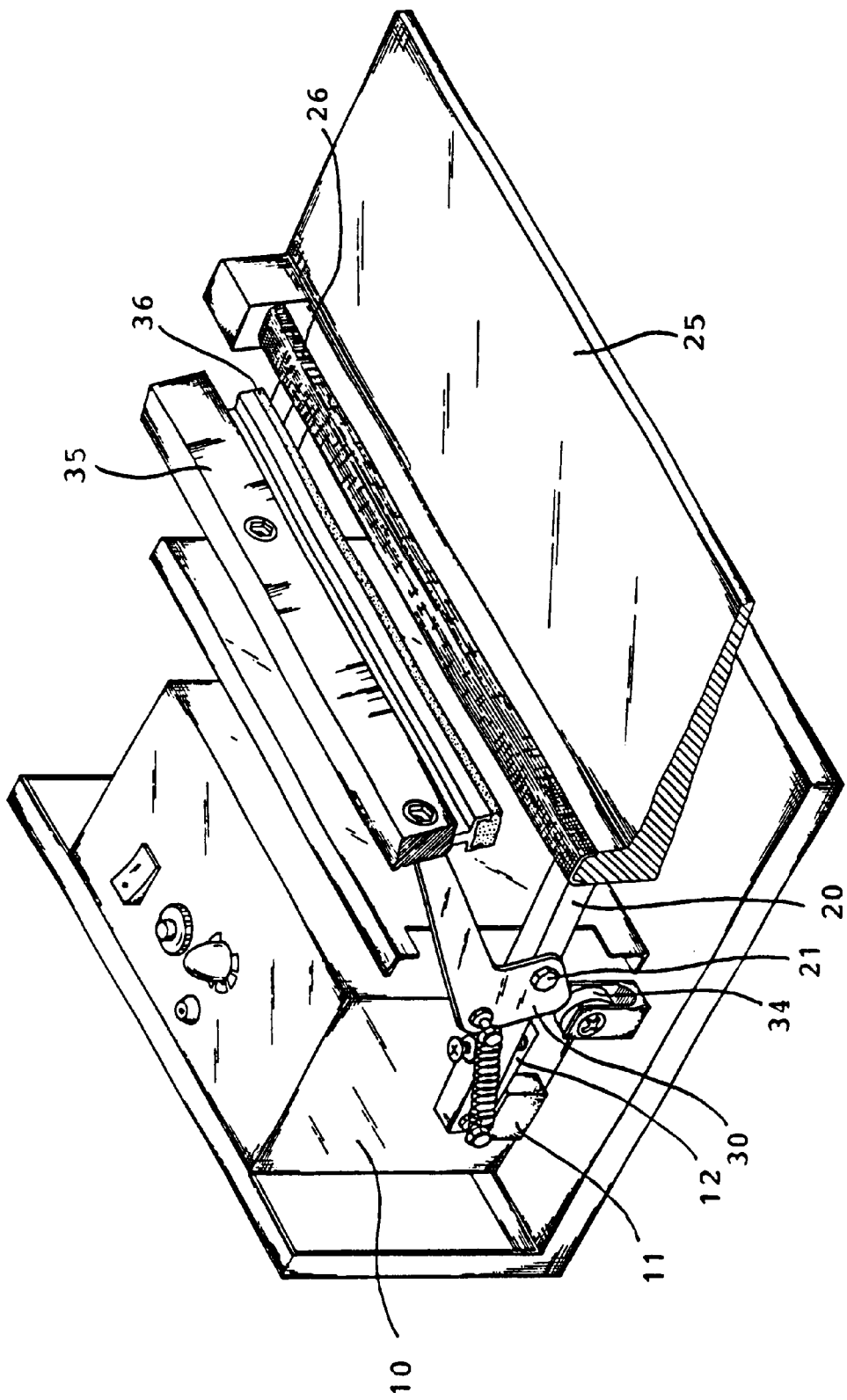
FIG. 2 is a perspective view illustrating a linking-up mechanism according to the present invention in part.
Figure 3:
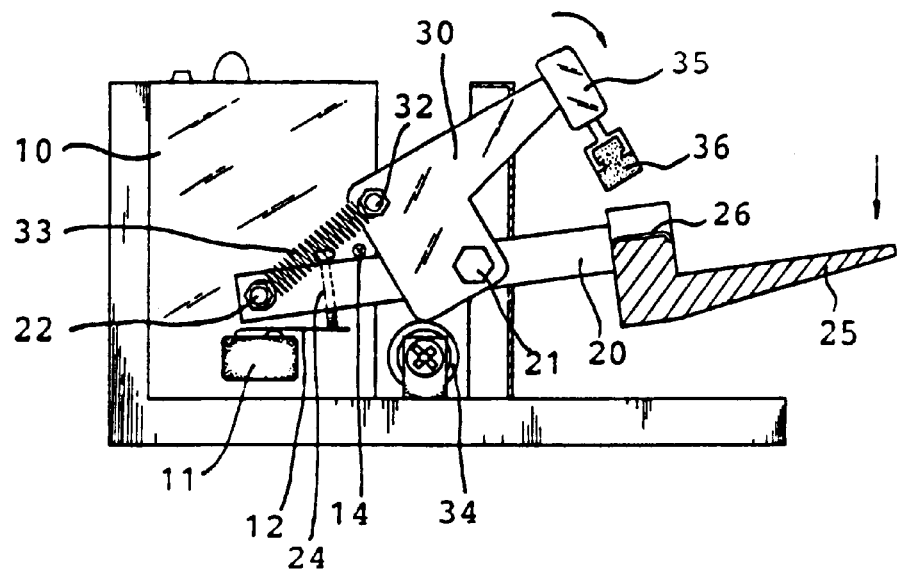
FIG. 3 is a schematic view illustrating the linking-up operation of the present invention.
Figure 4:
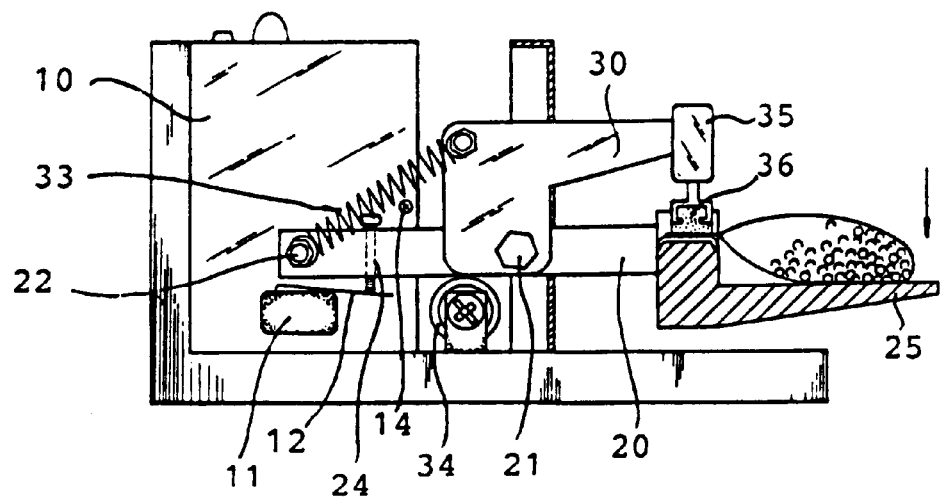
FIG. 4 is another schematic view showing the linking-up operation according to the present invention.

With reference to FIGS. 1–4, a press sealing structure of a sealing machine according to the present invention is a linking-up structure with two sides symmetrical in construction. Hence, the invention will be described hereinafter with respect to one of the sides of the structure only. In the press sealing structure of the present invention, a control box 10 is connected pivotally to a link 20 via axial bolts 22 on both sides thereof. A front end of the link 20 extends out from a machine base of the sealing machine to connect securely with a placement press plate 25 adapted to receive an article to be sealed placed thereon. A heating plate 26 extends upwardly from the placement press plate 25. The heating plate 26 utilizes an electrothermal metal conductive plate as a heat conductor, by means of which the opening of the plastic bag can be fused together. A screw bolt 24 is screwably secured on that part of the link 20 inside the machine base. The bolt 24 urges against a contact press plate 12 of a microswitch 11. When the link 20 is being pressed downwardly, the bolt will actuate the microswitch 11 to cause the heating plate 26 to heat up instantly to facilitate the hot press fusing operation on the opening of the plastic bag. Furthermore, a middle section of the link 20 is connected pivotally with a substantially L-shaped seat plate 30 by an axial bolt 21. A front end of the seat plate 30 extends out from the machine base to connect securely with an upper press rod 35. A heat-resistant plastic strip 36 is provided clampingly at a lower portion of the upper press rod 35, adapted to smooth out and press upon the opening of the plastic bag placed on the heating plate 26. A spring 33 is disposed intermediate the seat plate 30 and the link 20. By means of the resilience of the spring 33, the link 20 is caused to tilt upwardly and be positioned at a stop end 14. One side of the seat plate 30 has a bottom end edge that urges against and is slidable on a top side of a roller 34. The seat plate 30 may, due to the resilience of the spring 33, displaces a greater distance when tilting upwardly, as shown in FIG. 3, so that the sealing machine of the present invention can again proceed with the sealing operation.

In summary, the press sealing structure of a sealing machine according to the present invention utilizes a placement press plate connected securely to respective links on both sides of the machine base to further simultaneously link-up with two substantially L-shaped seat plates on both sides. It should be appreciated that a linking-up structure as described above is capable of overcoming the problems with conventional sealing machines.

Although the present invention has been illustrated and described with reference to the preferred embodiment thereof, it should be understood that it is in no way limited to the details of such embodiment but is capable of numerous modifications within the scope of the appended claims.

What is claimed is:

1. A press sealing structure of a sealing machine, comprising a control box on a machine base, said control box having both sides respectively connected pivotally to respective links by respective axial bolts, said links having respective front ends extending out from said machine base to connect securely with a placement press plate, a heating plate extending upwardly from said placement press plate, a screw bolt being secured screwably on that part of each of said links inside said machine base, said screw bolt urging against a contact press plate of a microswitch, a middle section of each of said links being connected pivotally with a substantially L-shaped seat plate by means of an axial bolt, said seat plate having a front end extending out from said machine base to connect securely with an upper press rod, a heat-resistant plastic strip being provided clampingly at a lower portion of said upper press rod, a spring being disposed intermediate said seat plate and the respective one of said links.

2. The press sealing structure of a sealing machine as defined in claim 1, wherein said links are simultaneously linked up with said seat plates.

3. The press sealing structure of a sealing machine as defined in claim 1, wherein said placement press plate and said seat plates are subjected to the resilient force of said spring to reset and tilt upwardly in a state of non-use.

4. The press sealing structure of a sealing machine as defined in claim 1, wherein said links are subjected to the resilient force of said spring to tilt slightly upwardly to be positioned at a stop end.

* * * * *